(12) United States Patent
Patel et al.

(10) Patent No.: US 7,813,722 B2
(45) Date of Patent: Oct. 12, 2010

(54) ENHANCED FEATURES IN AN ADVANCED VOICE SERVICES (AVS) FRAMEWORK FOR WIRELESS COMMUNICATIONS SYSTEMS

(75) Inventors: Krishnakant M. Patel, Dallas, TX (US); Bruce D. Lawler, San Jose, CA (US); Giridhar K. Boray, Plano, TX (US); Brahmananda R. Vempati, Dallas, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 491 days.

(21) Appl. No.: 11/356,775

(22) Filed: Feb. 17, 2006

(65) Prior Publication Data

US 2006/0234687 A1    Oct. 19, 2006

Related U.S. Application Data

(60) Provisional application No. 60/654,271, filed on Feb. 18, 2005.

(51) Int. Cl.
*H04M 3/493* (2006.01)
*H04M 11/10* (2006.01)
*H04B 1/38* (2006.01)

(52) U.S. Cl. .............. 455/414.2; 455/563; 455/413

(58) Field of Classification Search ............. 455/518, 455/414.1, 416, 413, 414.2; 370/310, 260, 370/328; 340/539.11; 379/67.1
See application file for complete search history.

(56) References Cited

U.S. PATENT DOCUMENTS

| | | | |
|---|---|---|---|
| 5,711,011 A | 1/1998 | Urs et al. | |
| 5,987,318 A | 11/1999 | Alperovich et al. | |
| 6,021,326 A | 2/2000 | Nguyen | |
| 6,138,011 A | 10/2000 | Sanders, III et al. | |
| 6,304,558 B1 | 10/2001 | Mysore | |
| 6,411,815 B1 | 6/2002 | Balasuriya | |
| 6,477,366 B1 * | 11/2002 | Valentine et al. | 455/416 |
| 6,661,878 B1 | 12/2003 | Mirashrafi et al. | |
| 7,026,926 B1 * | 4/2006 | Walker, III | 340/539.11 |
| 7,170,863 B1 * | 1/2007 | Denman et al. | 370/260 |
| 2001/0005372 A1 | 6/2001 | Cave et al. | |
| 2002/0196781 A1 | 12/2002 | Salovuori | |

(Continued)

FOREIGN PATENT DOCUMENTS

WO    WO 00/79825    12/2000

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner*—Charles N Appiah
*Assistant Examiner*—Kiet Doan
(74) *Attorney, Agent, or Firm*—Gates & Cooper LLP

(57) ABSTRACT

A real-time exchange (RTX) interfaces to a wireless communications system to provide enhanced features for advanced voice services (AVS), which include location-based information, voice portal integration, push ring tones and voice message screening.

7 Claims, 7 Drawing Sheets

U.S. PATENT DOCUMENTS

| | | |
|---|---|---|
| 2003/0016632 A1 | 1/2003 | Refai et al. |
| 2003/0078064 A1 | 4/2003 | Chan |
| 2003/0190888 A1 | 10/2003 | Mangal et al. |
| 2004/0057449 A1 | 3/2004 | Black |
| 2004/0067751 A1* | 4/2004 | Vandermeijden et al. .. 455/414.1 |
| 2004/0224710 A1* | 11/2004 | Koskelainen et al. ........ 455/518 |
| 2004/0259580 A1 | 12/2004 | Florkey et al. |
| 2005/0047362 A1* | 3/2005 | Harris et al. ................ 370/328 |
| 2005/0202807 A1 | 9/2005 | Ayyasamy et al. |
| 2005/0221819 A1 | 10/2005 | Patel et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0019654 A1 | 1/2006 | Farrill |
| 2006/0029189 A1* | 2/2006 | Patel et al. ................. 379/67.1 |
| 2006/0030347 A1 | 2/2006 | Biswas |
| 2006/0189337 A1* | 8/2006 | Farrill et al. ................ 455/518 |
| 2006/0234687 A1 | 10/2006 | Patel et al. |
| 2007/0037597 A1 | 2/2007 | Biswas et al. |
| 2007/0037598 A1 | 2/2007 | Ayyasamy et al. |

FOREIGN PATENT DOCUMENTS

| | | |
|---|---|---|
| WO | WO2005009006 | 12/2000 |
| WO | WO 03/101007 | 12/2003 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN__gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http://www.trackwell.com/news/news__twandtetra.htm.

* cited by examiner

ENHANCED FEATURES IN AN ADVANCED VOICE SERVICES (AVS) FRAMEWORK FOR WIRELESS COMMUNICATIONS SYSTEMS

CROSS REFERENCE TO RELATED APPLICATIONS

This application claims the benefit under 35 U.S.C. Section 119(e) of the following co-pending and commonly-assigned patent application:

U.S. Provisional Patent Application Ser. No. 60/654,271, filed Feb. 18, 2005, by Krishnakant M. Patel, Bruce D. Lawler, Giridhar K. Boray, and Brahmananda R. Vempati, entitled "ENHANCED FEATURES ON AN ADVANCED VOICE SERVICES (AVS) FRAMEWORK,";

which application is incorporated by reference herein.

This application is related to the following co-pending and commonly-assigned patent applications:

U.S. application Ser. No. 10/515,556, filed Nov. 23, 2004, by Gorachand Kundu, Ravi Ayyasaamy and Krishnakant Patel, entitled "DISPATCH SERVICE ARCHITECTURE FRAMEWORK," which application claims the benefit under 35 U.S.C. Section 365 of PCT International Patent Application Serial No. PCT/US03/16386, which application claims the benefit under 35 U.S.C. Section 119(e) of U.S. Provisional Patent Application Ser. Nos. 60/382,981, 60/383,179 and 60/407,168;

U.S. application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of PCT International Patent Application Serial No. PCT/US04/23038, which application claims the benefit under 35 U.S.C. Section 119(e) of U.S. Provisional Patent Application Ser. Nos. 60/488,638, 60/492,650 and 60/576,094 and which application is a continuation-in-part and claims the benefit under 35 U.S.C. Section 119, 120 and/or 365 of PCT International Patent Application Serial No. PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," which application claims the benefit under 35 U.S.C. Section 119(e) of U.S. Provisional Patent Application Ser. Nos. 60/569,953 and 60/579,309, and which application is a continuation-in-part and claims the benefit under 35 U.S.C. Sections 119, 120 and/or 365 of U.S. patent application Ser. No. 10/515,556 and PCT International Patent Application Serial No. PCT/US04/23038;

U.S. patent application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," which application claims the benefit under 35 U.S.C. Section 119(e) of U.S. Provisional Patent Application Ser. No. 60/571,075, and which application is a continuation-in-part and claims the benefit under 35 U.S.C. Sections 119, 120 and/or 365 of U.S. patent application Ser. No. 10/515,556 and P.C.T. International Patent Application Serial No. PCT/US04/23038;

U.S. patent application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," which application claims the benefit under 35 U.S.C. Section 119(e) of U.S. Provisional Patent Application Ser. Nos. 60/573,059 and 60/576,092, and which application is a continuation-in-part and claims the benefit under 35 U.S.C. Sections 119, 120 and/or 365 of U.S. patent application Ser. No. 10/515,556, P.C.T. International patent application Ser. No. PCT/US04/23038, U.S. patent application Ser. No. 11/126,587, and U.S. patent application Ser. No. 11/129,268; and U.S. patent application Ser. No. 11/136,233, filed May 24, 2005, by Krishnakant M. Patel, Vyankatesh Vasant Shanbhag, and Anand Narayanan, entitled "SUBSCRIBER INFORMATION MODULE (SIM) ENABLING ADVANCED VOICE SERVICES (AVS) INCLUDING PUSH TO TALK ON WIRELESS HANDSETS AND NETWORKS," which application claims the benefit under 35 U.S.C. Section 119(e) of U.S. Provisional Patent Application Ser. No. 60/573,780, and which application is a continuation-in-part and claims the benefit under 35 U.S.C. Sections 119, 120 and/or 365 of U.S. patent application Ser. No. 10/515,556, P.C.T. International Patent Application Serial No. PCT/US04/23038, U.S. patent application Ser. No. 11/126,587, and U.S. patent application Ser. No. 11/134,883;

U.S. patent application Ser. No. 11/158,527, filed Jun. 22, 2005, by F. Craig Farrill, entitled "PRESS-TO-CONNECT FOR WIRELESS COMMUNICATIONS SYSTEMS," which application claims the benefit under 35 U.S.C. Section 119(e) of U.S. Provisional Patent Application Ser. No. 60/581,954, and which application is a continuation-in-part and claims the benefit under 35 U.S.C. Sections 119, 120 and/or 365 of U.S. patent application Ser. No. 10/515,556 and P.C.T. International Patent Application Serial No. PCT/US04/23038; and U.S. patent application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Patent Application Ser. No. 60/588,464;

all of which applications are incorporated by reference herein.

BACKGROUND OF THE INVENTION

1. Field of the Invention

This invention relates in general to wireless communications systems, and more specifically, to enhanced features for advanced voice services wireless communications systems.

2. Description of Related Art

Advanced voice services (AVS), such as two-way half-duplex voice calls within a group, also known as Push-to-Talk (PTT) or Press-to-Talk (P2T), as well as other AVS functions, such as Push-to-Conference (P2C) or Instant Conferencing, Upgrade to Conference, Push-to-Message (P2M), etc. These AVS functions have enormous revenue earnings potential for wireless communications systems, such as cellular networks and personal communications systems (PCS) networks.

Currently, there are three major approaches employed in providing advanced voice services in wireless communications systems. One approach requires the installation of a dedicated private network, parallel to the wireless communications system, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on GSM (Global System for Mobile Communications) and CDMA (Code Division Multiple Access).

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless communications systems based on existing standards, such as GSM, CDMA, etc. However, even for the newer standards, solutions based on VoIP have serious drawbacks, including slower call setup, significant overhead, increased susceptibility to packet losses, low bit rate voice coders, and significant modifications to the mobile handset. There is a need, instead, for solutions that require only minimal upgrades to the handset.

Still another approach is that defined in co-pending and commonly-assigned U.S. application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," and U.S. application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which applications are incorporated by reference herein. In this approach, advanced voice services are provided by a dispatch gateway (DG) or real-time exchange (RTX) that interfaces to the wireless communications system to provide the advanced voice services therein, wherein both the dispatch gateway and mobiles that use the advanced voice services communicate with each other using call setup and in-band signaling within the wireless communications system.

Notwithstanding these innovations, there is a need in the art for other advanced voice services that comply with existing and emerging wireless standards and provide superior user experiences. The present invention aims to satisfy this need by providing enhanced features in advanced voice services for wireless communications systems.

SUMMARY OF THE INVENTION

To overcome the limitations in the prior art described above, and to overcome other limitations that will become apparent upon reading and understanding the present specification, the present invention discloses enhanced features for advanced voice services for wireless communications systems. A real-time exchange (RTX) interfaces to the wireless communications system to provide these enhanced features for the advanced voice services, which include location-based information, voice portal integration for client-less AVS operation, push ring tones and voice message screening.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention comprises enhanced features in an advanced voice service (AVS) for wireless communications systems. These enhanced features include location-based information, voice portal integration, push ring tones and voice message screening.

These features can be added to any wireless communications network, including CDMA, GSM, UMTS, and others. Moreover, these features are applicable to all commercial wireless radio frequency bands, and can be applied to any commercial, private, public, military and government radio frequency band in use around the world.

These features can also be delivered across any existing and future brand of wireless infrastructure that employs telecommunications industry standard signaling and transmission standards. Currently, wireless infrastructure from suppliers such as Ericsson, Nokia, Motorola, Lucent, Nortel, Siemens and Alcatel can be upgraded by adding the RTX to the core network and connecting the RTX through transmission facilities to the Mobile Switching Centers (MSCs).

In addition, these features can be implemented in digital wireless communications systems in any part of the world. The technology is applicable to any commercial mobile operator in all seven regions of the globe.

Also, these features can be applied to any manufacturer of wireless handsets across all frequency bands and radio access techniques. They can be applied to single mode, single band handsets up through multi-band, multi-mode handsets capable of global roaming.

Figure 1:
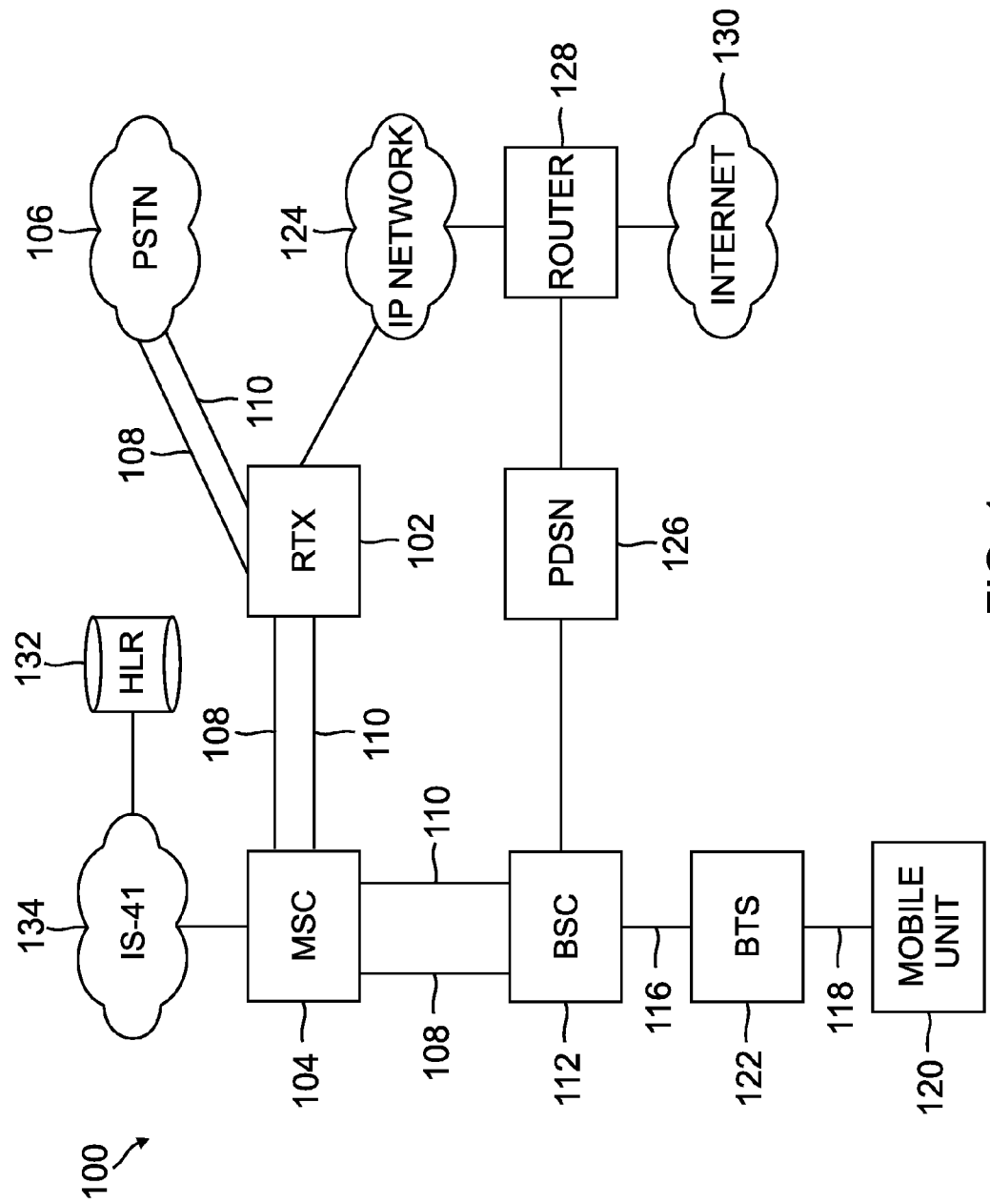
FIG. 1 is a block diagram that illustrates an exemplary embodiment of the dispatch services architecture framework according to a preferred embodiment of the present invention.

These services can be operated simultaneously with other premium voice services over the wireless communications system. It is anticipated that these features will co-exist on the same wireless communications system, thereby leveraging the capital investment and operating cost Network Architecture FIG. 1 is a block diagram that illustrates an exemplary embodiment of a wireless communications network 100, according to a preferred embodiment of the present invention, for making calls to and from mobile units, wherein the calls are initiated by call setup and in-band signaling within the wireless communications network 100.

Within the network 100, an RTX (Real-Time Exchange) 102, previously known as a Dispatch Gateway (DG), interfaces to the wireless communications network 100 to provide advanced voice services therein. The RTX 102 communicates with a MSC (Mobile Switching Center) 104 and PSTN (Public Switched Telephone Network) 106 using SS7—ISUP/WIN/CAMEL (Signaling System 7—Integrated Services Digital Network (ISDN) User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice codec conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with the mobile unit or handset 120 via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the AVS call request to the RTX 102), the RTX 102 identifies each terminating handset 120 and their MS-ISDN (Mobile Station ISDN Number) number. It sends an ISUP call origination request for each terminating mobile unit 120. It may send requests directly to the MSC 104, PSTN 106 or IP (Internet Protocol) network 124 via a PDSN (Public Data Switched Network) 126, Router 128, and/or Internet/Intranet 130, depending on the routing table configuration for terminating MS-ISDN numbers. Once the bearer path 110 is established, the RTX 102 begins a negotiation with the far end (in this case, the terminating BSC 112) for each terminating leg to a mobile unit 120. Once bearer paths 110 are established for originating and terminating legs for an AVS call, the RTX 102 switches (or duplicates) voice frames between the mobile units 120 across bearer paths in the wireless communications network 100. In this manner, both the RTX 102 and the mobile units 120 that use the advanced voice services communicate with each other using the call setup and in-band signaling within the wireless communications network 100 and the RTX 102 switches the voice frames for the advanced voice services for the mobile units 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a mobile unit 120 to the RTX 102 (because it would require changes in the MSC 104), the latter does not have any information of the registered mobile units 120. To circumvent this issue, a registration and presence application runs over an IP stack in the mobile unit 120. After the mobile unit 120 registers for a data interface (i.e., obtaining an IP address) with the PDSN 126, the registration and presence application in the mobile unit 120 registers with the RTX 102 using its IP address. The RTX 102 also uses this IP interface to update the presence information of other group members to a mobile unit 120. There is also provision to use SMS (Short Message Service) transport to carry presence messages if an operator chooses to use SMS over a data channel.

During roaming, a Home Location Register (HLR) 132 can be accessed via the MSC 104 and an IS-41 link 134. The HLR 132 can be used to track the presence of mobile units 120 for members of a group within the network 100 and updates the mobile units 120 for those members with the network 100 availability of other members of the group.

Real Time Exchange

Figure 2:
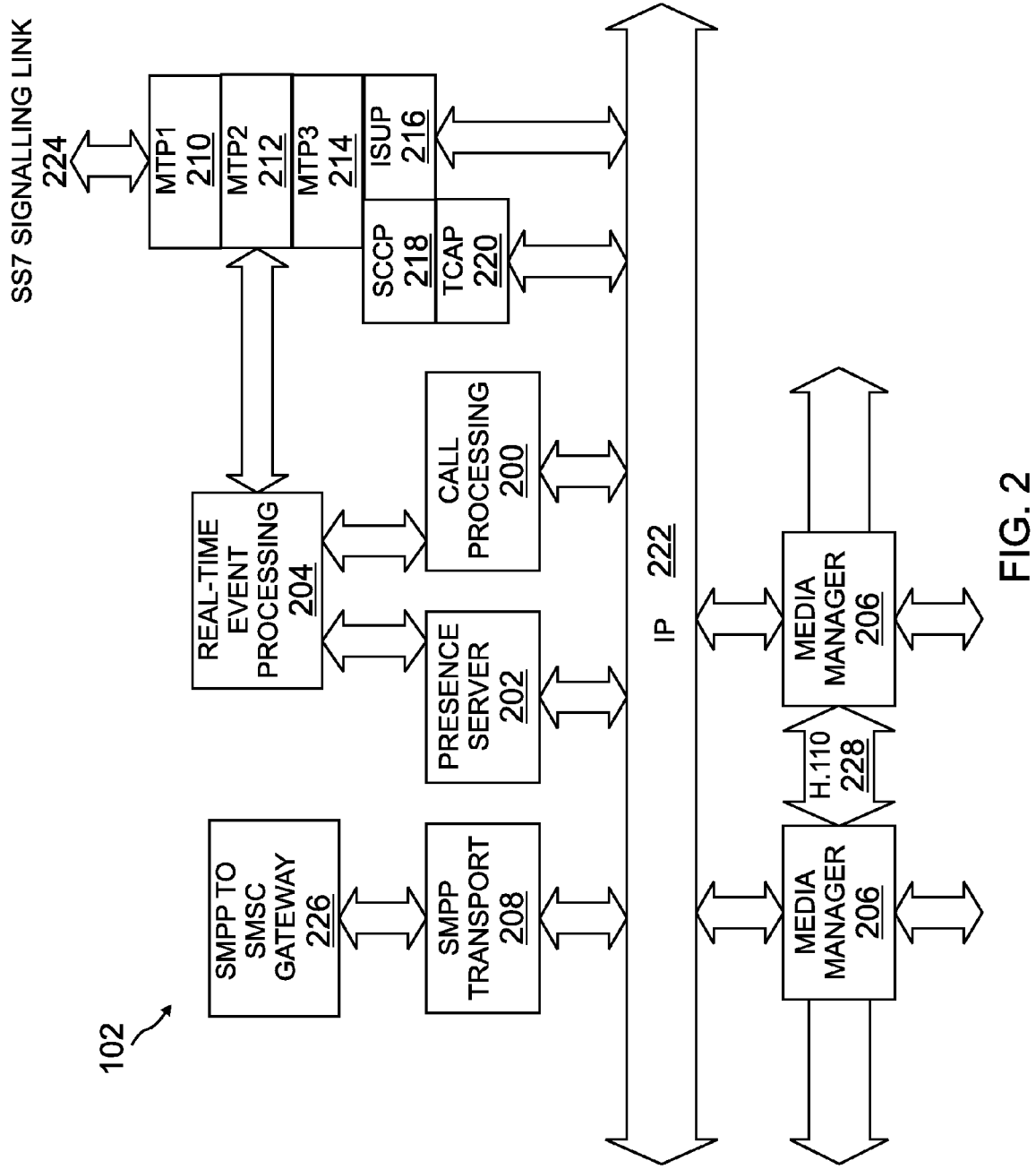
FIG. 2 is a block diagram that illustrates the architecture of the real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228.

Location Based Services (LBS) for Enhanced Group Communications

In one embodiment, the enhanced features comprise location-based services (LBS) for enhancing the calls to and from the mobile units 120. The location-based services utilize knowledge of position information of a mobile unit 120 to provide localized and contextual information for group communications between mobile units 120, wherein the localized and contextual information comprises locations of the mobile units 120 participating in the group communications. Combined with presence and availability management, as described in U.S. application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," which application is incorporated by reference herein, location information can enhance the group communications experience with "nearness" and location of contacts. Potential uses include mass-market applications such as friend finder and enterprise applications for workforce and fleet management.

Figure 3:
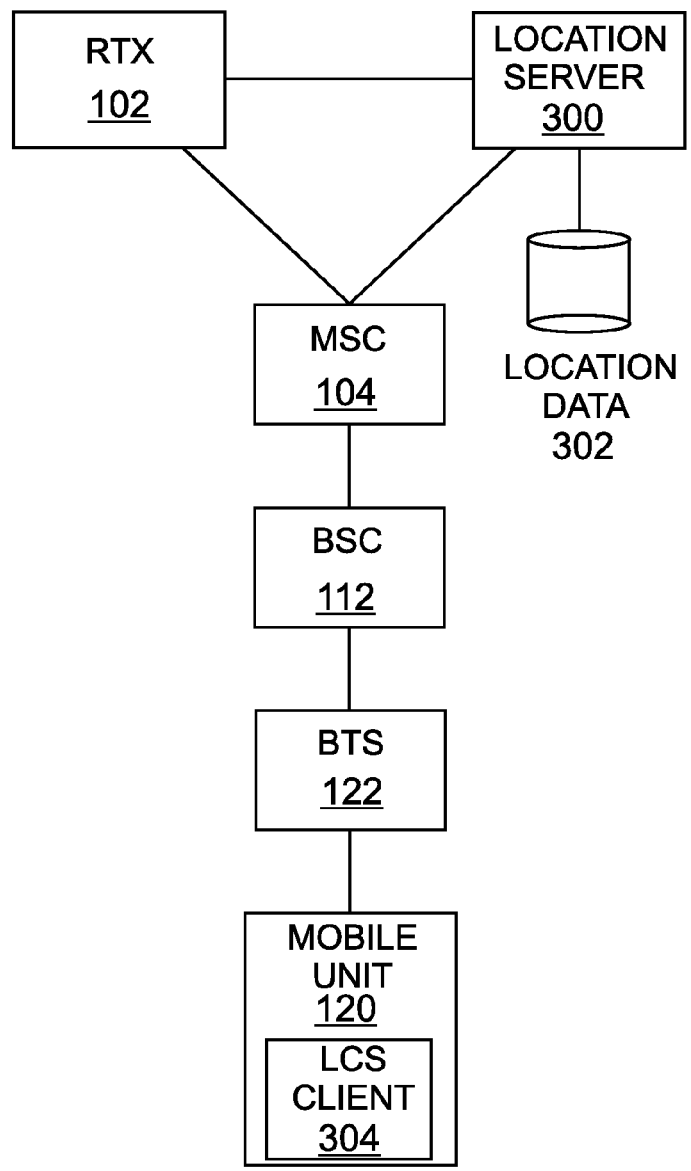
FIG. 3 is a block diagram that illustrates location based services for enhanced group communications according to the preferred embodiment of the present invention.

As shown in FIG. 3, the RTX 102 leverages the underlying Location Services (LCS) framework of a location-enabled wireless communications network 100. In one embodiment, the RTX 102 interfaces to one or more Location Servers 300 using a Mobile Location Protocol (MLP), wherein the Location Servers 300 store Location Data 302 on the mobile units 120.

MLP is an application-level protocol for querying the position of mobile units 120 independent of underlying network technology. MLP is used to provide services, such as:

Standard Location Immediate Service,
Emergency Location Immediate Service,
Standard Location Reporting Service,
Emergency Location Reporting Service,
Triggered Location Reporting Service, and
Enhanced Features on AVS.

The Standard Location Immediate Service is a standard query service with support for a large set of parameters. This service is used when a (single) location response is required immediately (within a set time) or the request may be served by several asynchronous location responses (until a predefined timeout limit is reached). This service typically includes the following messages: Standard Location Immediate Request, Standard Location Immediate Answer and Standard Location Immediate Report.

The Emergency Location Immediate Service, is a service used especially for querying of the location of a mobile unit 120 that has initiated an emergency call. The response to this service is required immediately (within a set time) or the request may be served by several asynchronous location responses. This service typically includes the following messages: Emergency Location Immediate Request, Emergency Location Immediate Answer and Emergency Location Immediate Report.

The Standard Location Reporting Service is a service that is used when a mobile unit 120 requests that its LCS Client 304 to receive the location of the mobile unit 120. The position is sent to the LCS Client 304 from the Location Server 300, wherein the LCS Client 304 may include one or more LCS applications. This service typically includes the following messages: Standard Location Report and Standard Location Report Answer.

The Emergency Location Reporting Service is a service that is used when the wireless communications network 100 automatically initiates the positioning of a mobile unit 120 at an emergency call. The position and related data of the mobile unit 120 is then sent to an emergency system (e.g., a 911 system) from the Location Server 300. This service typically includes the following message: Emergency Location Report.

The Triggered Location Reporting Service is a service used when the location of a mobile unit 120 should be reported at a specific time interval or on the occurrence of a specific event. This service typically includes the following messages: Triggered Location Reporting Request, Triggered Location Reporting Answer, Triggered Location Report, Triggered Location Reporting Stop Request and Triggered Location Reporting Stop Answer.

Client-Less AVS Solution with Voice Portal Integration

In another embodiment, the enhanced features comprise voice recognition services for enhancing the calls to and from the mobile units 120. These features are provided using a client-less AVS solution with voice portal integration. Hence, this solution also applies equally well to landline phones. Voice portals provide telephone users with a natural language interface to access and retrieve network 100 services. Typically, voice portals are based on speaker-independent speech recognition technologies.

For example, voice portals have been extensively used for 1-800 directory enquiry, flight information, etc., and have matured over the years with improved speech recognition accuracy. In addition, the advent of standard voice scripting language, such as VoiceXML, has fueled growth of voice portal services just as HTML did for web services.

Figure 4A:
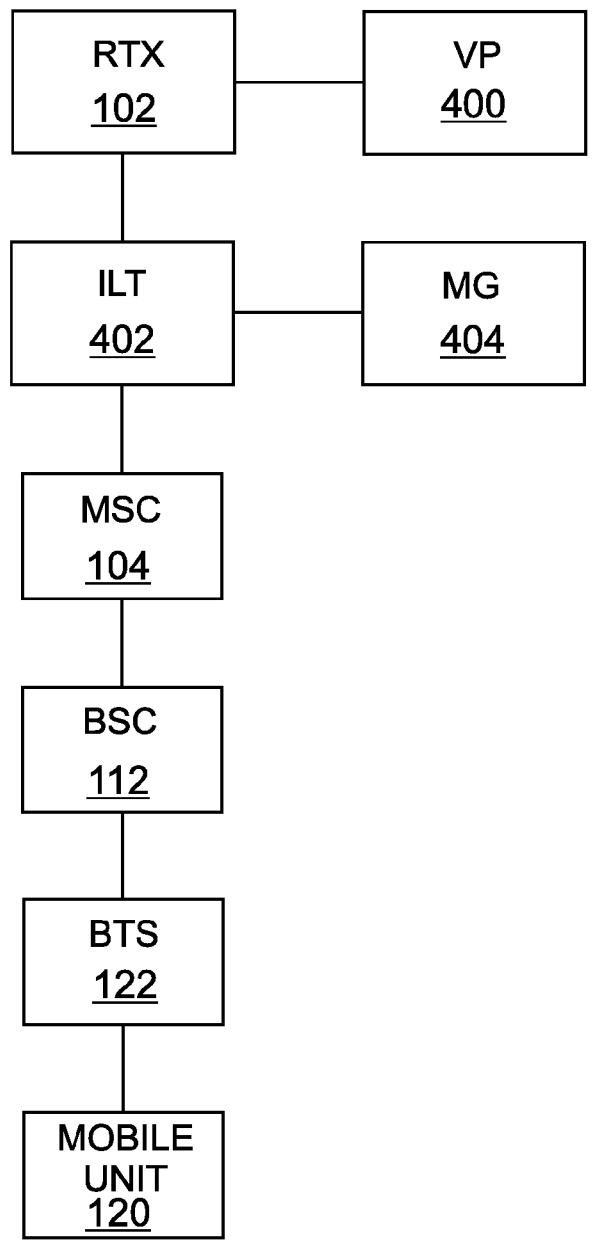
FIGS. 4A, 4B and 4C are a block diagram and flow charts that illustrate voice portal integration according to the preferred embodiment of the present invention.

FIG. 4A illustrates the architecture used by the present invention in leveraging the underlying voice recognition systems of a wireless communications network 100. In this embodiment, the RTX 102 interfaces to one or more Voice Portals (VPs) 400, as well as an Integrated Local and Transit (ILT) switch 402. The ILT 402 also interfaces to the VP 400 via a Media Gateway (MG) 404. In addition, the RTX 102 interfaces to the MSC 104 through the ILT 402 (or interfaces directly to the MSC 104 as shown in FIG. 1) to control group-call signaling, as well as voice frame buffering and duplication.

The integration of the RTX 102 with a standard VP 400 opens up unlimited possibilities to expand the reach of AVS. Moreover, the integration of the RTX 102 with the VP 400 eliminates the need for a client in the mobile unit 120.

Consider the example where the voice recognition services are used to invoke Instant Conferencing services within a group of mobile units 120 identified in the RTX 102. The typical scenario comprises the following:

the user dials a pre-determined code on the mobile unit 120 to access the VP 400, the mobile unit 120 receives a confirmation tone from the VP 400, the user inputs a voice command on the mobile unit 120 (for example, by saying "conference friends") to invoke instant conferencing with a group identified as "friends" in the RTX 102, the VP 400 performs speech recognition and sends the decoded message to the RTX 102, and the RTX 102 places the conference call to the chosen group.

The steps involved in performing these functions are described in more detail in the FIGS. 4B and 4C below.

Figure 4B:
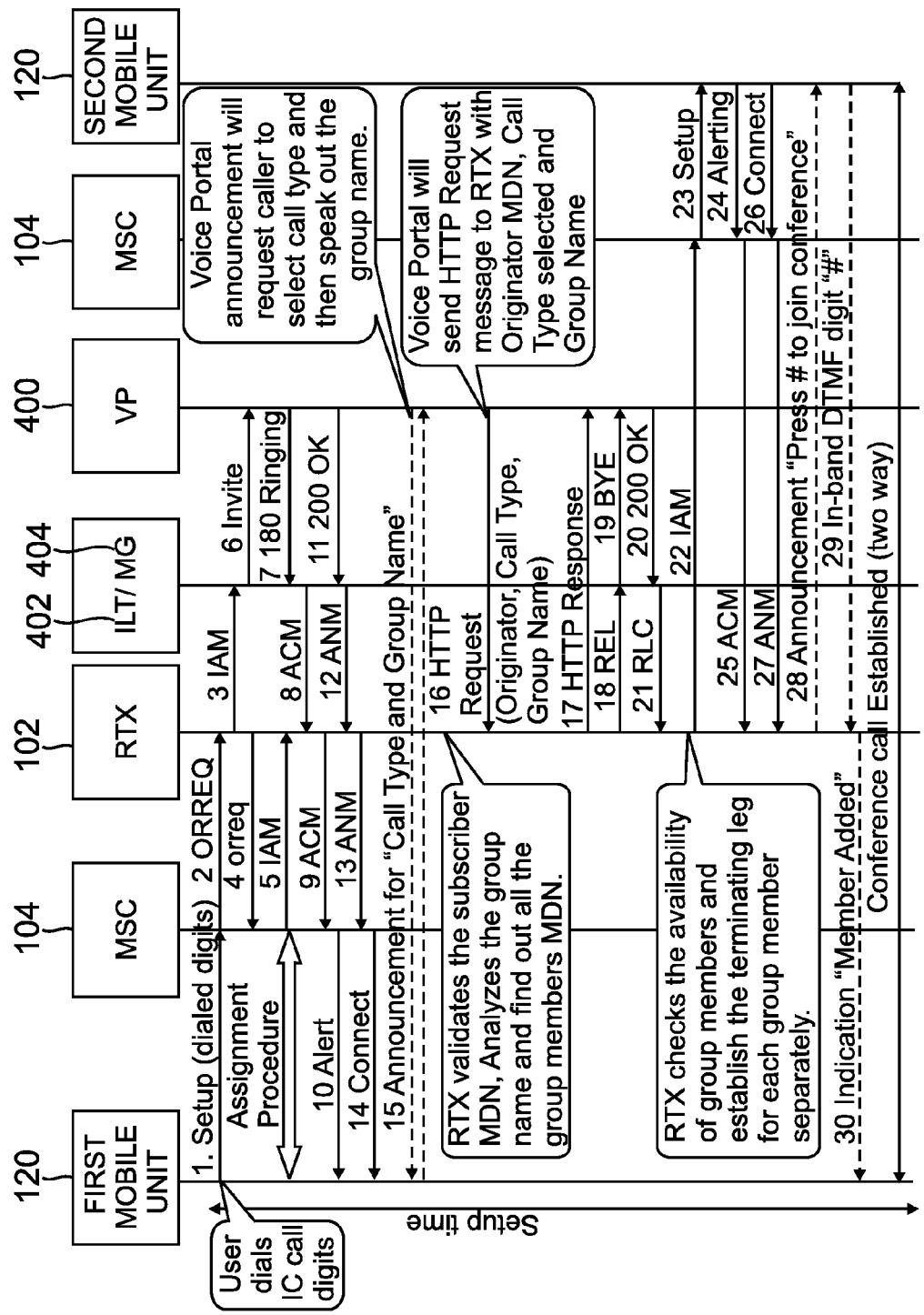

FIG. 4B is a flowchart illustrating the call flows involved in initiating a conference call using the VP 400 according to the preferred embodiment of the present invention.

1. The user initiates the instant conference call by dialing the RTX 102 number provided by the network 100 operator on the first mobile unit 120. The dialed digits contain the access code for the RTX 102.

2. In response, the MSC 104 sends an ORREQ (Origination Request) message to the RTX 102.

3. The RTX 102 analyses the incoming ORREQ message and initiates a call with the VP 400 with a preconfigured VP 400 number in the RTX 102. The RTX 102 sends an SS7/ISUP message to the ILT 402/MG 404.

4. The RTX 102 instructs the MSC 104 to connect to the RTX 102 by specifying a redirection number in the ORREQ response message.

5. The MSC 104 triggers an assignment procedure for radio resources for the first mobile unit 120 and begins routing the call based on the redirection number received from the RTX 102. The MSC 104 terminates the call to the RTX 102 by sending an IAM (Initial Address Message) message.

6. The ILT 402/MG 404 forwards the call set up "Invite" message to the Voice Portal 400 using SIP (Session Initiation Protocol).

7. The VP 400, after receiving the Invite message, immediately responds with a "180 Ringing" message.

8. The ILT 402/MG 404 translates the "180 Ringing" message to an SS7 ACM (Address Complete Message) message and forwards it to the RTX 102.

9. The RTX 102 forwards an address complete ACM message to the MSC 104.

10. The MSC 104 sends an "Alert" message to the first mobile unit 120 to trigger alerting at the first mobile unit 120.

11. The VP 400 answers the call and sends a "200 OK" answer message with an SDP (Session Description Protocol) parameter to the RTX 102.

12. The ILT 402/MG 404 translates the "200 OK" message to an SS7 ANM (ANswer Message) message and forwards it to the RTX 102.

13. The RTX 102 sends the ANM message to the MSC 104.

14. The MSC 104 sends a Connect message to the first mobile unit 120, which stops the alerting tone at the first mobile unit 120.

15. The VP 400 plays an announcement to the first mobile unit 120, requesting the call type and group name. The VP 400 collects this voice command from the first mobile unit 120 and converts the voice command into a string format.

16. The VP 400 sends the string format voice command to the RTX 102 in an HTTP request message.

17. The RTX 102 analyses the call type and group name in the string format voice command. If the group is present in the RTX 102, it responds with a "Success" HTTP response message to the VP 400.

18. The RTX 102 sends an SS7 "Release" (REL) message and releases the call leg with the ILT 402/MG 404.

19. The ILT 402/MG 404 translates the SS7 REL message to an SIP "Bye" message and forwards it to the VP 400.

20. The VP 400 acknowledges with a "200 Ok" SIP message.

21. The ILT 402/MG 404 terminates the call leg with a "Release Complete" (RLC) message.

22. The RTX 102 obtains the MDN of all the group members in the group and sends an IAM message to initiate the call with each member individually.

23. The MSC 104 receives the IAM message and sends a setup message to each terminating mobile unit 120 (i.e., the second mobile unit 120).

24. The second mobile unit 120 responds with an ACM alert message.

25. The MSC 104 forwards this ACM alert message to the RTX 102.

26. The second mobile unit 120 answers the call and sends a Connect message to the MSC 104.

27. The MSC 104 forwards the Connect message as an ANM message to the RTX 102.

28. The RTX 102 plays an announcement to the second mobile unit 120 to accept the conference call.

29. The user accepts the call by pressing the "#" key on the second mobile unit 120. This is sent to the RTX 102 using a DTMF in-band digit.

30. The RTX 102 connects the conferencing parties and plays an announcement for each member addition to all the existing parties.

31. The instant conference call is now established.

Figure 4C:
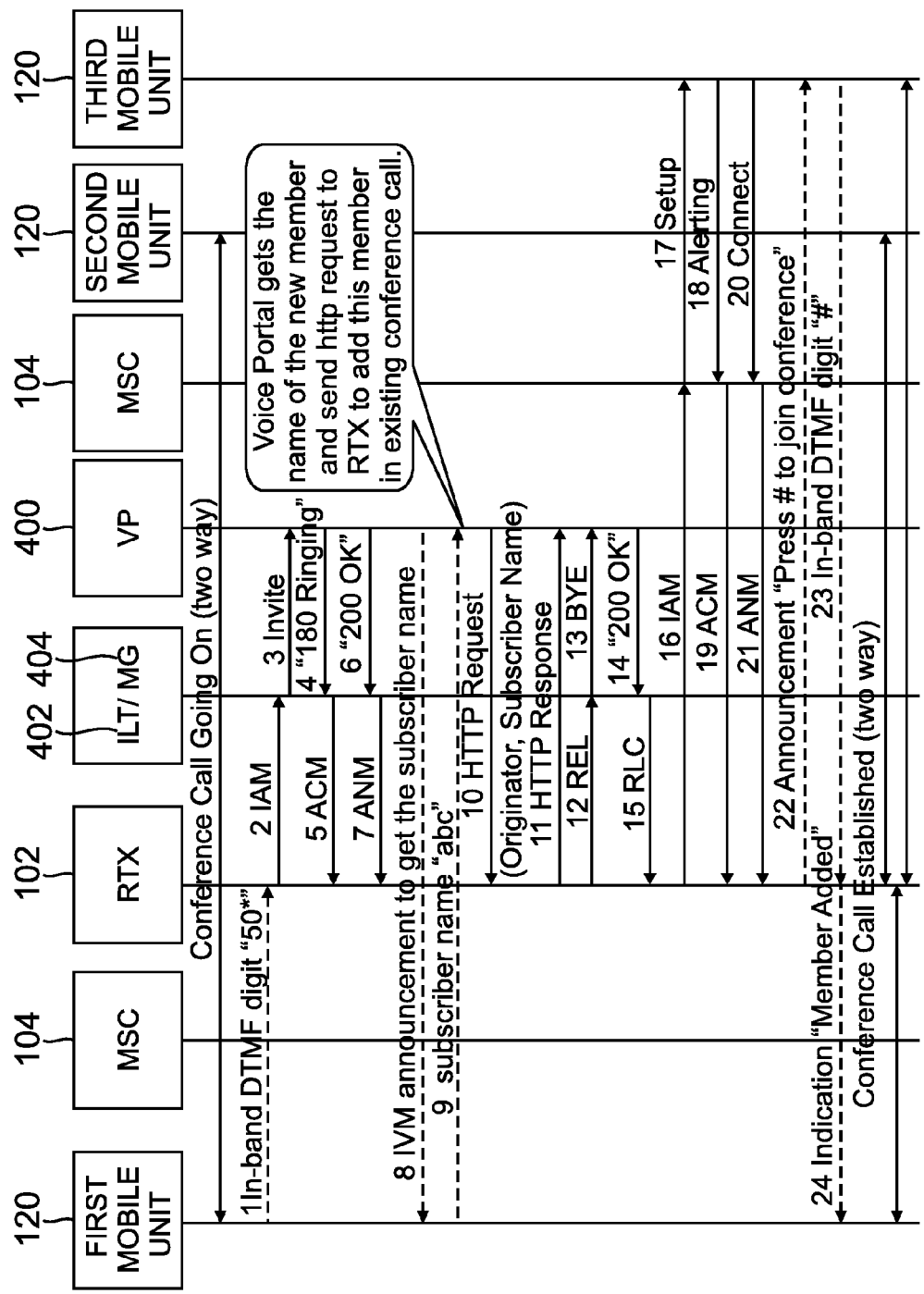

FIG. 4C is a flowchart illustrating the call flows involved in adding a new member to an existing conference call using the VP 400 according to the preferred embodiment of the present invention.

1. The user wants to add a new member in ongoing conference call. The user dials a code "50*" (or other code) on the first mobile unit 120, which is published by operator for this function.

2. The RTX 102 receives the code as DTMF digits. The RTX 102 recognizes that the user wants to add new member and initiates a new call leg with the VP 400 by sending an SS7 IAM message to the ILT 402/MG 404.

3. The ILT 402/MG 404 forwards the call set up "Invite" message to the VP 400 using SIP.

4. The VP 400, after receiving the Invite message, immediately responds with an "180 Ringing" message.

5. The ILT 402/MG 404 translates the "180 Ringing" message to an SS7 ACM message and forwards the message to the RTX 102.

6. The VP 400 answers the call and sends a "200 OK" answer message with an SDP parameter to the RTX 102.

7. The ILT 402/MG 404 translates the "200 OK" message to an SS7 ANM message and forwards the message to the RTX 102.

8. The bearer path is now set up between the first mobile unit 120 and the VP 400. The VP 400 plays an announcement to the first mobile unit 120 requesting the input of the subscriber name to be added to the existing conference call.

9. The user inputs the subscriber name as a voice command on the first mobile unit 120.

10. The VP 400 translates the voice command to a string input and sends an HTTP message to the RTX 102 with the originator MDN and string input.

11. The RTX 102 analyses the string input for the subscriber name and, if the subscriber is provisioned in the RTX 102, responds with a "Success" HTTP response message to the VP 400.

12. The RTX 102 sends an SS7 "Release" (REL) message and releases the call leg with the ILT 402/MG 404.

13. The ILT 402/MG 404 translates the SS7 REL message to an SIP "Bye" message and forwards the message to the VP 400.

14. The VP 400 acknowledges with a "200 Ok" SIP message.

15. The ILT 402/MG 404 terminates the call leg with a "Release Complete" (RLC) message.

16. The RTX 102 obtains the MDN of the new subscriber and sends an IAM message to initiate a call with that subscriber.

17. The MSC 104 receives the IAM and sends a setup message to the terminating mobile unit 120 (i.e., the third mobile unit 120).

18. The third mobile unit 120 responds with an ACM alert message.

19. The MSC 104 forwards this ACM alert message to the RTX 102.

20. The third mobile unit 120 answers the call and sends a Connect message to the MSC 104.

21. The MSC 104 forwards the Connect message as an ANM message to the RTX 102.

22. The RTX 102 plays an announcement to the third mobile unit 120 to accept the conference call.

23. The user accepts the call by pressing the "#" key on the third mobile unit 120, which is then sent to the RTX 102 using a DTMF in-band digit.

24. The RTX 102 establishes the two-way connection between the RTX 102 and third mobile unit 120 and plays an announcement for the new member addition to all existing parties.

25. The third mobile unit 120 has now been added to the conference call between the first and second mobile units.

While the foregoing illustrations exemplified the application of voice portal integration for instant conferencing, similar methods can be derived for implementing other AVS applications, such as Push-to-Talk, Push to Message, etc, with a client-less solution based on voice portal integration.

Push Ring Tones

In another embodiment, the enhanced features comprise "push" ring tones that provide the capability for a calling party to specify a ring-tone for the mobile unit 120 of a called party. In other words, a personalized ring tone of the originating mobile unit 120 (calling party) is "pushed" to the terminating mobile unit 120 (called party).

Preferably, the RTX 102 stores one or more personalized ring tones for the mobile unit 120. The personalized ring tone is selected by the calling party of an originating mobile unit 120. The ring tone may comprise tones, music or other audio or video content (recorded voice, video etc.), including audio or video content downloadable from the Internet. Upon selection, these ring tones are "pushed" or downloaded from the RTX 102 to one or more terminating mobile units 120.

There are a number of benefits to "push" ring tones:

Entertainment: the present invention provides a tool for the calling party to create their own identity when calling other parties.

Personalization: the present invention provides a tool for the called party to immediately identify the calling party without looking at the screen on their mobile unit 120. Moreover, this technique may be used with audio and video ring tones.

Voice Message Screening

Figure 5:
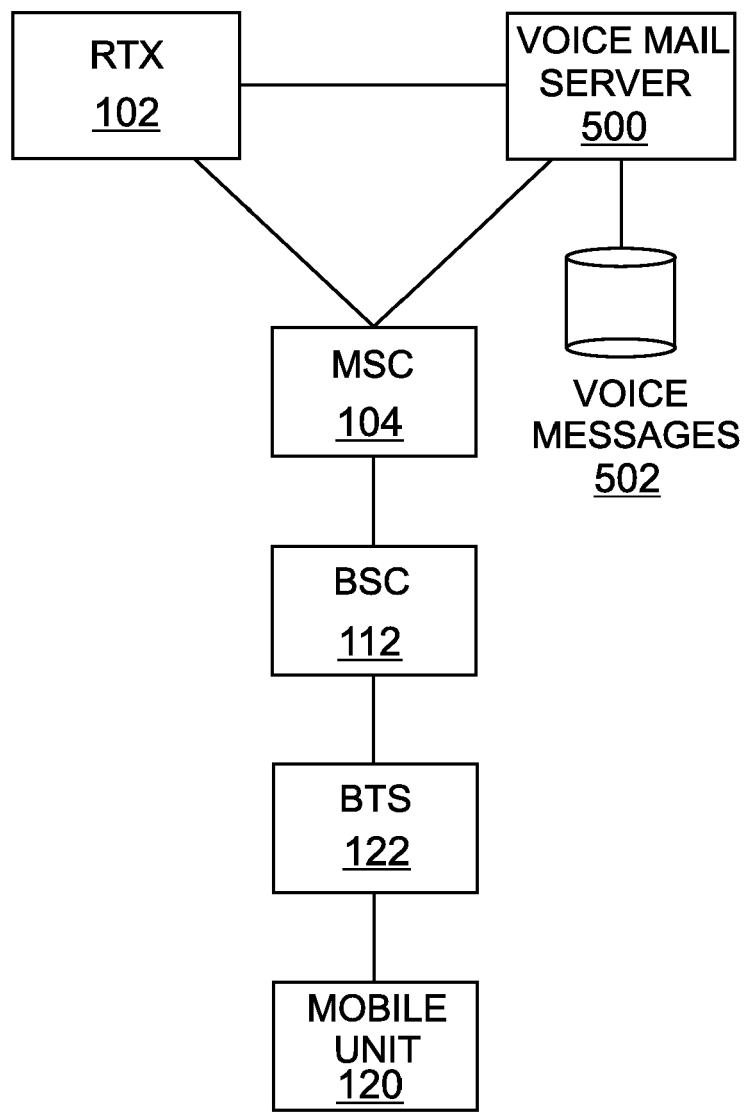
FIG. 5 is a block diagram that illustrates voice message screening according to the preferred embodiment of the present invention.

In yet another embodiment, the enhanced features comprise voice message screening capabilities. As shown in FIG. 5, the RTX 102 leverages the underlying voice mail system of a wireless communications network 100. In one embodiment, the RTX 102 interfaces to one or more Voice Mail Servers (VMS) 500, and upon request, routes voice messages 502 in real-time from the VMS 500 to the mobile unit 120.

In this scenario, a called party screens the voice message 502 being deposited by a calling party on the mobile unit 120 of the called party, while the voice message 502 is being deposited and while the deposit proceeds in a normal manner. Preferably, the calling party is unaware that the voice message 502 is being screened on the mobile unit 120 of the called party. The called party may elect to pick up the call associated with the voice message 502 being deposited, while the deposit is still in process, by invoking a function on the mobile unit 120 of the called party.

Thus, in operation, the present invention is similar to "old" home answering machine scenarios, where voice message 502 recordings are heard "live" while being stored, and the called party may or may not pick up while the voice message 502 is being deposited.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing enhanced features for advanced voice services in a wireless network, comprising:
   a wireless communications network for making calls to and from mobile units, wherein the calls are initiated by call setup and in-band signaling within the wireless communications network and voice frames for the calls are switched between the mobile units by at least one mobile switching center across bearer paths in the wireless communications network; and
   a real-time exchange that interfaces to at least one mobile switching center in the wireless communications network to provide advanced voice services therein, without requiring any changes to the mobile switching center or other equipment of the wireless network to provide the advanced group services;
   wherein both the real-time exchange and the mobile units that use the advanced voice services communicate with each other using the call setup and in-band signaling within the wireless communications network, such that at least one mobile switching center routes an originating leg of the advanced voice services from an originating mobile unit to the real-time exchange, the real-time exchange initiates one or more terminating legs of the advanced voice services to one or more terminating mobile units through at least one mobile switching center, and the real-time exchange switches the voice frames for the advanced voice services for the mobile units across the bearer paths and through at least one mobile switching center in the wireless communications network; and
   wherein the enhanced features comprise location-based services (LBS) provided by the real-time exchange for enhancing the calls to and from the mobile units, such that the real-time exchange utilizes position information of the mobile units to provide localized and contextual information, in addition to presence availability, to the mobile units for use by subscribers, and the localized and contextual information comprises locations of the mobile units participating in group communications provided by the advanced voice services.

2. An apparatus for providing enhanced features for advanced voice services in a wireless network, comprising:
   a wireless communications network for making calls to and from mobile units, wherein the calls are initiated by call setup and in-band signaling within the wireless communications network and voice frames for the calls are switched between the mobile units by at least one mobile switching center across bearer paths in the wireless communications network; and
   a real-time exchange that interfaces to at least one mobile switching center in the wireless communications network to provide advanced voice services therein, without requiring any changes to the mobile switching center or other equipment of the wireless network to provide the advanced group services;
   wherein both the real-time exchange and the mobile units that use the advanced voice services communicate with each other using the call setup and in-band signaling within the wireless communications network, such that at least one mobile switching center routes an originating leg of the advanced voice services from an originating mobile unit to the real-time exchange, the real-time exchange initiates one or more terminating logs of the advanced voice services to one or more terminating mobile units through at least one mobile switching center, and the real-time exchange switches the voice frames for the advanced voice services for the mobile units across the bearer paths and through at least one mobile switching center in the wireless communications network; and
   wherein the enhanced features comprise voice recognition services provided by the real-time exchange for enhancing the calls to and from the mobile units, such that the real-time exchange performs the voice recognition services to convert voice commands received from the mobile units to invoke functions of the real-time exchange to establish a conference call between a group of mobile units identified in the real-time exchange.

3. The apparatus of claim 2, wherein the voice recognition is performed using a client-less mobile unit.

4. The apparatus of claim 2, wherein the voice recognition is performed to invoke the advanced voice services.

5. An apparatus for providing enhanced features for advanced voice services in a wireless network, comprising:
   a wireless communications network for making calls to and from mobile units, wherein the calls are initiated by call setup and in-band signaling within the wireless communications network and voice frames for the calls are switched between the mobile units by at least one mobile switching center across bearer paths in the wireless communications network; and
   a real-time exchange that interfaces to at least one mobile switching center in the wireless communications network to provide advanced voice services therein, without requiring any changes to the mobile switching center or other equipment of the wireless network to provide the advanced group services;

wherein both the real-time exchange and the mobile units that use the advanced voice services communicate with each other using the call setup and in-band signaling within the wireless communications network, such that at least one mobile switching center routes an originating leg of the advanced voice services from an originating mobile unit to the real-time exchange, the real-time exchange initiates one or more terminating legs of the advanced voice services to one or more terminating mobile units through at least one mobile switching center, and the real-time exchange switches the voice frames for the advanced voice services for the mobile units across the bearer paths and through at least one mobile switching center in the wireless communications network; and wherein the real-time exchange stores a personalized ring-tone for the mobile unit, so that, the personalized ring-tone is selected by the calling party of an originating mobile unit and pushed to a terminating mobile unit of a called party, by downloading the personalized ring-tone for the terminating mobile unit of the called party from the real-time exchange to the terminating mobile unit of the called party.

6. An apparatus for providing enhanced features for advanced voice services in a wireless network, comprising:

a wireless communications network for making calls to and from mobile units, wherein the calls are initiated by call setup and in-band signaling within the wireless communications network and voice frames for the calls are switched between the mobile units by at least one mobile switching center across bearer paths in the wireless communications network; and a real-time exchange that interfaces to at least one mobile switching center in the wireless communications network to provide advanced voice services therein, without requiring any changes to the mobile switching center or other equipment of the wireless network to provide the advanced group services;

wherein both the real-time exchange and the mobile units that use the advanced voice services communicate with each other using the call setup and in-band signaling within the wireless communications network, such that at least one mobile switching center routes an originating leg of the advanced voice services from an originating mobile unit to the real-time exchange, the real-time exchange initiates one or more terminating legs of the advanced voice services to one or more terminating mobile units through at least one mobile switching center, and the real-time exchange switches the voice frames for the advanced voice services for the mobile units across the bearer paths and through at least one mobile switching center in the wireless communications network; and wherein the real-time exchange interfaces to one or more voice mail servers, and upon request, routes voice messages from the voice mail servers to the mobile unit of the called party, so that the called party can screen the voice messages being deposited by a calling party on the mobile unit of the called party, while the voice message is being deposited and while the deposit of the voice message proceeds in a normal manner, and wherein the called party elects to pick up the call associated with the voice message being deposited, while the deposit is still in process, by invoking a function on the mobile unit of the called party.

7. The apparatus of claim 6, wherein the calling party is unaware that the voice message is being screened on the mobile unit of the called party.

* * * * *